US006828575B2

(12) United States Patent
Luo et al.

(10) Patent No.: US 6,828,575 B2
(45) Date of Patent: Dec. 7, 2004

(54) PHOTONIC CRYSTALS: A MEDIUM EXHIBITING ANOMALOUS CHERENKOV RADIATION

(75) Inventors: Chiyan Luo, West Roxbury, MA (US); Mihai Ibanescu, Piatra Neamt (RO); Steven G. Johnson, St. Charles, IL (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/672,015

(22) Filed: Sep. 26, 2003

(65) Prior Publication Data

US 2004/0108471 A1 Jun. 10, 2004

Related U.S. Application Data

(60) Provisional application No. 60/413,799, filed on Sep. 26, 2002.

(51) Int. Cl.$^7$ .............................. G21G 4/00; G01T 1/22
(52) U.S. Cl. .............................. 250/493.1; 250/363.01; 250/361 R; 250/362; 250/336.1; 385/129; 385/132
(58) Field of Search ......................... 250/493.1, 363.01, 250/361 R, 362, 336.1; 385/129, 132

(56) References Cited

U.S. PATENT DOCUMENTS

| 5,905,263 A | 5/1999 | Nishizawa et al. |
| 6,552,347 B1 * | 4/2003 | Dimcovski ............. 250/363.01 |
| 2003/0016915 A1 * | 1/2003 | Prather et al. ................ 385/50 |

FOREIGN PATENT DOCUMENTS

GB    2 163 252 A    2/1986

WO    WO 02/14913    2/2002

OTHER PUBLICATIONS

"The Electrodynamics of substances with simultaneously negative values of ∈ and μ, " Veselago. *Soviet Physics*. Jan–Feb. 1968. vol. 10, No. 4.
"Cherenkov Radiation at Speeds Below the Light Threshold: Phonon–Assisted Phase Matching," Stevens et al. *Science*. Jan 2001. vol. 291.
"Visible Light from Localized Surface Charges Moving Across a Grating," Smith et al. *Letters to the Editor*. Sep. 1953.
"Interaction of Radiation and Fast Electrons with clusters of Dielectrics: A Multiple Scattering Approach," Abajo. *Physical Review Letters*. Mar. 1999. vol. 82, No. 13.
"Cerenkov Radiation in Inhomogeneous Periodic Media," Casey et al. *Physical Review*. Nov. 1965. vol. 140, No. 3B.
"Slow Group Velocity and Cherenkov Radiation," *Physical Review Letters*. Aug. 2001. vol. 87, No. 6.
"Cerenkov Radiation in Photonic Crystals," Luo et al. *Science*. Jan. 2003. vol. 299.
"Smith–Purcell radiation from metallic and dielectric photonic crystals," Ohtaka. Technical Digest. Cleo/Pacific Rim 2001. 4$^{th}$ Pacific Rim Conference on Lasers and Electo–optics. Jul. 2001. p. I–272–3.

* cited by examiner

*Primary Examiner*—Nikita Wells
(74) *Attorney, Agent, or Firm*—Gauthier & Connors LLP

(57) ABSTRACT

A system for exhibiting Cherenkov radiation is provided. The system includes a beam of charged particles. A photonic crystal structure receives said beam of charged particles. The charged particles moves in said photonic crystal structure so that Cherenkov radiation is produced at all velocities without requiring resonances in the effective material constants of said photonic crystal structure.

20 Claims, 9 Drawing Sheets v=0.1c     v=0.15c     v=0.3c     v=0.6c no cone     $\alpha_m > \pi/2$     $\alpha_m < \pi/2$     $\alpha_m < \pi/2$ v=0.1c    v=0.15c    v=0.3c    v=0.6c

PHOTONIC CRYSTALS: A MEDIUM EXHIBITING ANOMALOUS CHERENKOV RADIATION

PRIORITY INFORMATION

This application claims priority from provisional application Ser. No. 60/413,799 filed Sep. 26, 2002, which is incorporated herein by reference in its entirety.

This invention was made with government support under Grant Number DMR-9808941 awarded by the NSF. The government has certain rights in the invention.

BACKGROUND OF THE INVENTION

The invention relates to the field of Cherenkov radiation, and in particular to using photonic crystals as a medium to exhibit anomalous Cherenkov radiation.

Cherenkov radiation (CR) is the coherent electromagnetic response of a medium driven by the swift passage of a charged particle. It is thus an effect strongly dependent on the medium dispersion. In a uniform, isotropic medium with frequency-independent permittivity $\in$ and permeability $\mu$, the condition for CR is well-known, where the velocity of the particle v must exceed the phase velocity of the medium $v_{ph}=c/\sqrt{\in\mu}$. For a dispersive medium, such as a nonmagnetic material with a Lorentz-form dielectric response $\in(\omega)$, $v_{ph}(\omega)=c/\sqrt{\in(\omega)}$, is a function of frequency $\omega$. Because $\in(\omega)$ can reach arbitrarily high values near a resonance, it was long recognized that CR in a dispersive medium can happen for small charge velocities, e.g., $v<v_{ph}(0)$. The sub-threshold CR in a material near its phonon-polariton resonance was disclosed in *Cherenkov Radiation at Speeds Below the Light Threshold: Phonon-Assisted Phase Matching*, by T. E. Stevens, J. K. Wahlstrand, J. Kuhl, and R. Merlin, SCIENCE, vol. 291, No. 5504 (26 Jan. 2001).

On the other hand, it was conjectured that there could exist another class of materials which have both $\in$ and $\mu$ being negative, henceforth referred to as "negative index materials." The properties of such materials were disclosed in *The Electrodynamics of Substances with Simultaneously Negative Values of $\in$ and $\mu$*, by V. G. Veselago, SOVIET PHYSICS USPEKHI, vol. 10, No. 4 (January–February 1968). It was suggested that a negative index material would reverse many of the well-known laws of optics. In particular, CR effect is predicted to be reversed, i.e., a fast-moving charge in a negative index medium should radiate in the direction opposite to that of its velocity.

A further possibility exists when the charged particle travels near a periodic structure, where simple Bragg scattering can give rise to radiation without any velocity threshold. This phenomenon (the Smith-Purcell effect) was disclosed in *Visible Light from Localized Surface Charges Moving across a Grating*, by S. J. Smith and P. M. Purcell, PHYSICAL REVIEW, vol. 92, No. 4 (15 Nov. 1953). The radiation due to traveling charged particles has since been studied in one-dimensionally periodic multilayer stacks in *Cerenkov Radiation in Inhomogeneous Periodic Media*, by K. F. Casey, C. Yeh, and Z. A. Kaprielian, PHYSICAL REVIEW, vol. 140, No. 3B (8 Nov. 1965), and near the surface of dielectric structures in *Interactions of Radiation and Fast Electrons with Clusters of Dielectrics: A Multiple Scattering Approach*, by F. J. Garcia de Abajo, PHYSICAL REVIEW LETTERS, vol. 82, No. 13 (29 Mar. 1999).

SUMMARY OF THE INVENTION

According to one aspect of the invention, there is provided a system for exhibiting Cherenkov radiation. The system includes a beam of traveling charged particles. A photonic crystal structure receives the beam of charged particles. The charged particles move in the photonic crystal structure so that CR is produced at all velocities without requiring resonances in the effective material constants of said photonic crystal structure.

According to another aspect of the invention, there is provided a method of exhibiting Cherenkov radiation. The method includes providing a beam of traveling charged particles. Also, the method includes providing a photonic crystal structure that receives the beam of charged particles. The charged particles move in the photonic crystal structure so that Cherenkov radiation is produced at all velocities without requiring resonances in the effective material constants of said photonic crystal structure.

DETAILED DESCRIPTION OF THE INVENTION

Figure 1:
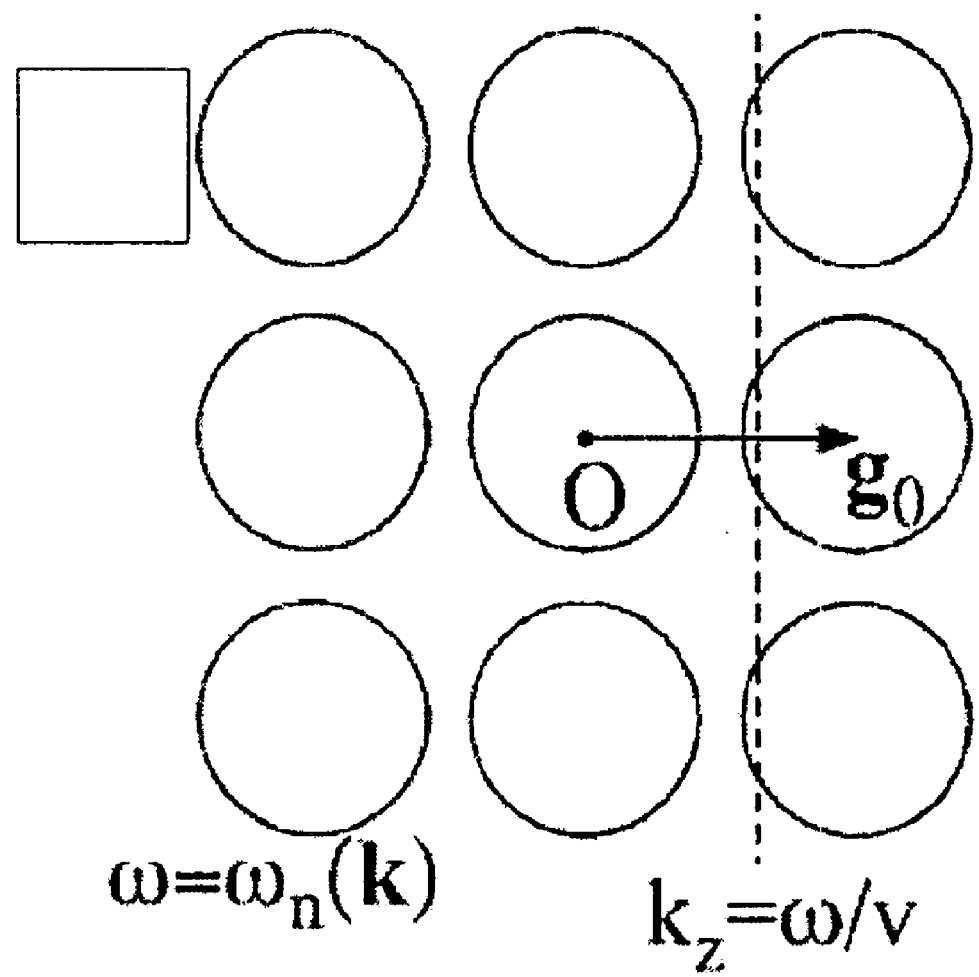
FIG. 1 is a schematic diagram of a radiation mode in a photonic crystal.

The invention describes using photonic crystals, i.e. periodic lattices for electromagnetic waves, as a medium which exhibits Cherenkov radiation (CR) and proposes new devices that make use of this effect. When a photonic crystal is coherently excited with a beam of traveling charged particles, the CR is produced. The radiation has its origin in both the transition radiation, which occurs when the charge experiences an inhomogeneous dielectric environment provided by the crystal, and the conventional CR in a uniform material, in which coherence is preserved throughout the medium. Unlike the Smith-Purcell effect, in which light is generated near a periodic grating and then propagates down through a uniform medium, the CR in this invention is generated and propagates through the same crystal in the form of Bloch waves.

Due to the very complex Bragg scattering effect and the rich photon dispersion relations in a photonic crystal, the properties of Bloch waves can be very different from waves in a uniform medium, leading to a variety of unusual phenomena. In particular, a charge moving in a photonic crystal radiates at all velocities without requiring the usual Cherenkov threshold condition or resonances in the effective material constants. Moreover, the invention predicts new CR wavefront patterns that are impossible to achieve within either a uniform medium or the Smith-Purcell effect. Furthermore, the invention demonstrates situations in which CR propagates backward, a behavior reminiscent of that predicted in negative-index materials, without requiring the material constants to become negative. The invention provides systematic methods for analyzing these new phenomena, and confirms predictions by direct numerical simulations.

By discussing the general condition for Cherenkov radiation in photonic crystals, it is important to consider a particle of charge q moving at a constant velocity v on a z axis inside a photonic crystal. An analytical expression for the fields generated by such a moving charge can be derived using the standard normal-mode expansion in Fourier space as:

$$E = \sum_{kng} \frac{4\pi i((k+g)\cdot v)qv\cdot e^*_{kn(-g)}}{N\Omega(\omega_{kn}^2 - ((k+g)\cdot v)^2)} E_{kn} e^{-i(k+g)\cdot vt} \quad \text{Eq. 1}$$

Here, the wavevector k is summed over all points in the first Brillouin zone, the band index n runs over all bands, and the reciprocal-lattice vector g is summed over all the reciprocal space.

$$E_{kn} = \sum_G e_{knG} e^{i(K+G)\cdot r}$$

is the eigenmode of the photonic crystal at Bloch wavevector k and band index n with corresponding Fourier component $e_{knG}$ and eigen-frequency $\omega_{kn}$ (the photonic band structure), and is normalized according to $1/\Omega \int dr \in (r) E_{kn} E^*_{lm} = \delta(k-1)\delta_{nm}$ with $\Omega$ being the volume of a spatial unit cell of the photonic crystal. N is the number of the unit cells of the crystal, and $N\Omega$ is the total volume under consideration.

In the well-studied case of a uniform medium in which simple analytical expressions are available for $E_{kn}$ and $\omega_{kn}$, Eq. 1 can be shown to be equivalent to the familiar Fermi results. In the case of a general photonic crystal, the far-field radiation modes can be deduced from the poles in Eq. 1. If restricted to positive frequencies, one can find the condition for radiation to be $\omega_{kn}=(k+g)\cdot v$. Each solution set of k, n and g then corresponds to a CR mode emitted by the photonic crystal. The relative excitation strength of each mode is proportional to the magnitude of $e_{kn(-g)}$ multiplied by slow functions of k and g on the numerator of Eq. 1. Since $\omega_{kn}=\omega_{(k+g)n}$, the radiation condition may also be written as $$\omega_{kn}=k\cdot v \quad \text{Eq. 2}$$

with k now in an arbitrary Brillouin zone. In this way, g is just the reciprocal-lattice vector required to reduce k to the first Brillouin zone.

Eq. 2 is the general condition for CR in a photonic crystal, and can be easily reduced to the usual threshold condition mentioned earlier in the case of a uniform dielectric medium. In a general photonic crystal, it may be solved by intersecting the plane $k\cdot v=\omega$ in k-space with the photonic-crystal dispersion surface $\omega_{kn}=\omega$ in the periodic zone scheme, as shown in FIG. 1. The dispersion surface is similar to a normal surface in crystal optics, but is the surface formed by k instead of the phase velocity. For each fixed n, solutions to Eq. 2 exist for arbitrary v. This is because, as $\omega$ goes from the minimum to the maximum frequency of band n, the dispersion surface traverses through all possible k-points, and the plane $k_z=\omega/v$ only sweeps through a region with finite width in $k_z$ in k-space. Thus, no threshold exists for CR in photonic crystals. In particular, a moving charge can radiate even for $v\to 0$. Physically, this effect is similar to the Umclapp process in solid-state physics. As $v\to 0$ the solution for smallest frequency exists at $\omega \approx g_0\cdot v$, $g_0$ being a primitive reciprocal-lattice vector with smallest positive $g_0\cdot v$. Note that since the radiation frequency goes to zero as $v\to 0$, the present effect is fundamentally different from a similar result in dispersive medium, which requires $\in\to\infty$ and radiation can only be near a fixed resonance frequency. In principle, this applies to any g, but the coupling strength, which is proportional to $|e_{kn(-g)}|$, must go to zero for large g.

Positive frequency, as described in Eq. 2, requires that $k\cdot v > 0$. In a uniform medium with positive index, energy flows along k, and thus a moving charge emit energy forward, i.e., the direction of radiation makes an acute angle with v. In a negative index material, the situation is reversed. The angle between energy flow and the velocity is now obstuse, and a moving charge must radiate backwards.

In the case of a general photonic crystal, the direction of energy flow should be determined from the direction of the group velocity, i.e. the Poyning vector associated with the solution to Eq. 2. In the periodic zone scheme, there are many bands which have group velocities opposite to that of k. If these bands are coupled to an appropriate v in Eq. 2, then there is a CR in the direction opposite to that of v. Therefore, a negative group-velocity is a sufficient condition for reversed the CR effect. Note that this condition can be applied in the long-wavelength limit in the second Brillouin zone, where the photonic crystal exhibits positive effective index.

Figure 2:
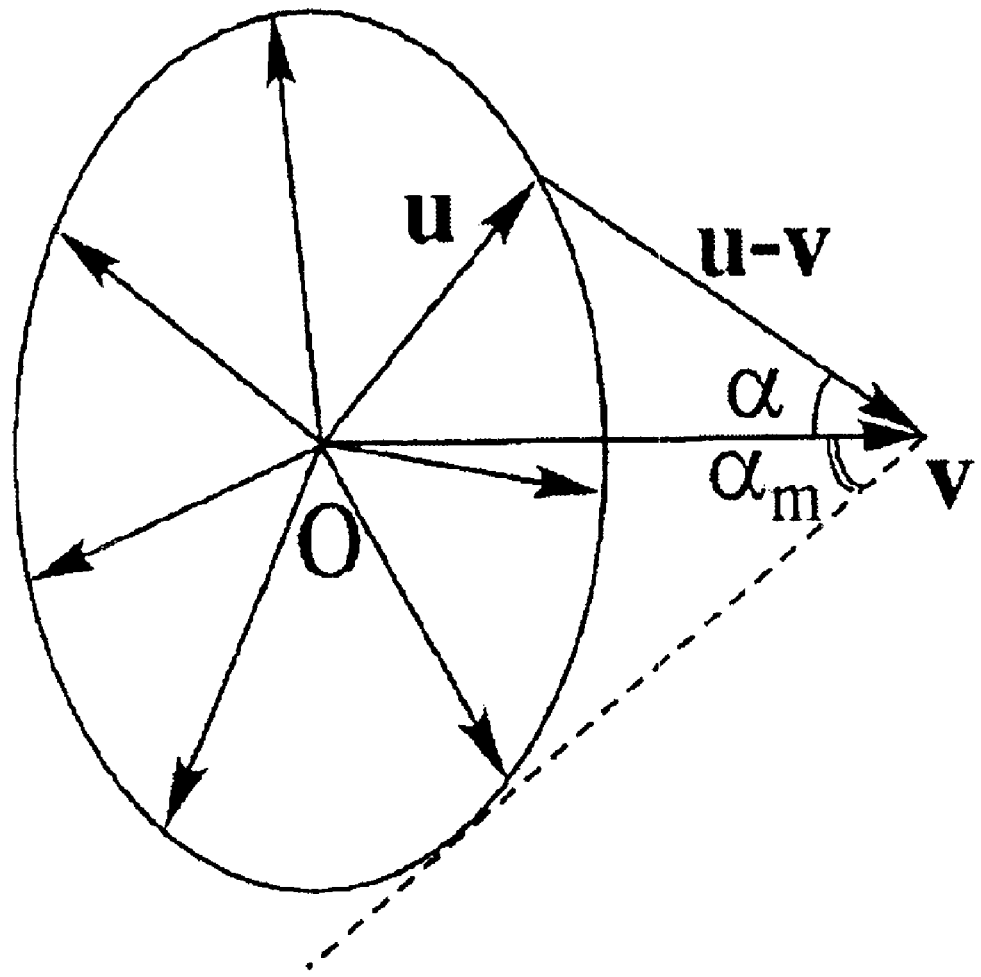
FIG. 2 is a schematic diagram of a radiation cone.

Another characteristic of CR is the shape of the radiation wavefront. In a uniform nondispersive medium, it is well-known that a forward-pointing shock-front is produced on a cone behind the charged particle (the presence of dispersion removes the singularity). The difference between group velocities and phase velocities also alters the shape of the radiation cone. Here the invention presents a graphical method for determining the shape of the cone, as shown in FIG. 2, which can be easily extended to the case of photonic crystals. FIG. 2 illustrates a plot having both v and the group velocities u of all modes in Eq. 2 in a velocity-space. The trace of u is analogous to the ray surface in crystal optics, though in the present case it is formed by the group velocities of different frequencies. The magnitude of u is proportional to the distance traveled by the wavefront of the corresponding mode, and the magnitude of v is proportional to distance traveled by the moving charge. Thus, for each mode, the wavefront of radiation still lies on a cone whose angle is determined by the angle $\theta$ between v-u and v. The maximum of all $\theta$'s determine the angle of the overall cone that encompasses all radiation. Propagating Bloch modes can only exist on the rear side of this overall cone, whereas the fields are evanescent on the forward side, and across the cone the radiation field amplitude experiences a drop.

From these considerations it is understood that the group velocities of the modes determined by Eq. 2 are a key to understanding CR in photonic crystals. They can be calculated either from the gradient vectors to the dispersion surface or from the Heynman-Feynman Theorem specialized to photonic crystals. The detailed behavior of group velocities in a specific photonic crystal is studied further hereinafter.

Figure 3A:
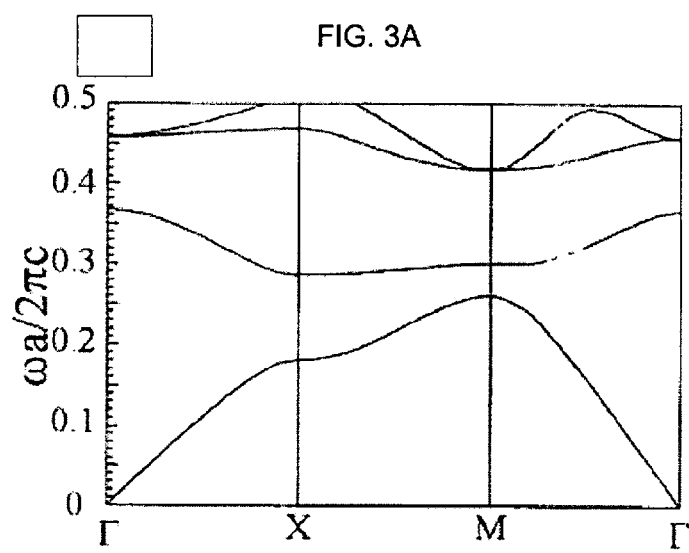
FIG. 3A is a TE bandstructure of a 2D square lattice with air columns.
Figure 3B:
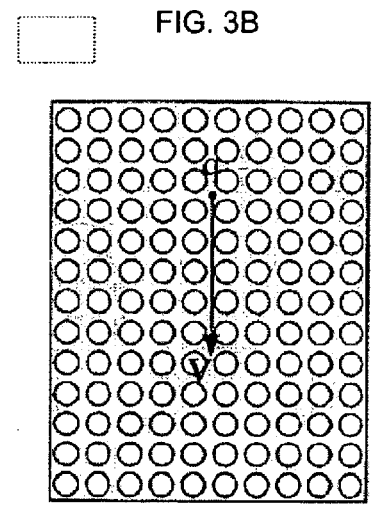
FIG. 3B is schematic diagram illustrating a moving charge in the photonic crystal.

For concreteness, a specific problem in 2D is addressed to illustrate the above analysis. Suppose a charge moves inside an infinite 2D square lattice of air columns in dielectric ∈=12, as shown in FIG. 3A. The columns have a radius of 0.4 a, where a is the period of the lattice, and the charge is moving in the 2D plane in the (10) lattice direction. The photonic-crystal TE (in-plane electric field E, appropriate for CR) bandstructure and the geometry of this problem are shown in FIG. 3B. Eq. 2 is solved to determine the radiation modes of this photonic crystal and their group velocities, using software that calculates the photonic bands by preconditioned conjugate-gradient minimization of the block Rayleigh quotient in a planewave basis. For purposes of discussion, only the frequencies in the first band are analyzed and those in higher bands can be discussed similarly. The results are plotted in FIGS. 4A–4C for several different v's.

Figure 4A:
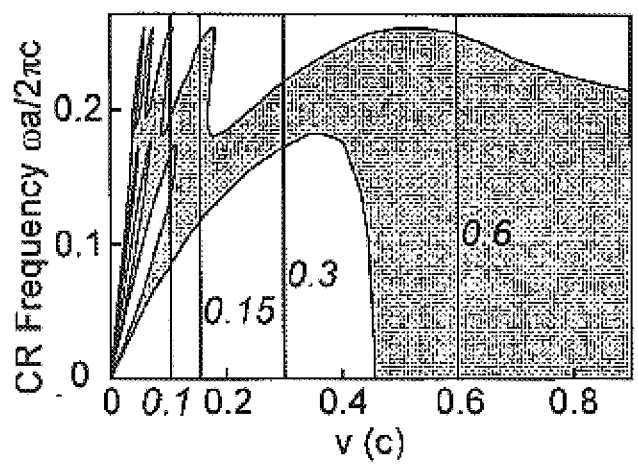
FIGS. 4A–4C are graphs illustrating the relationship between the frequency, the wavevector k, and the corresponding group velocity u of the radiation modes in the first band of the photonic crystal of FIG. 3B.
Figure 4B:
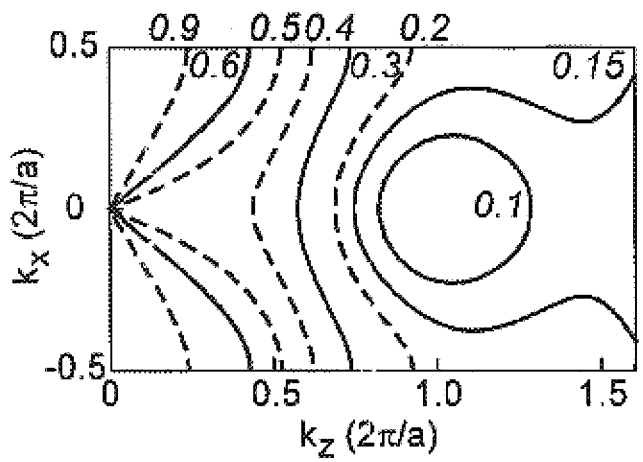
Figure 4C:
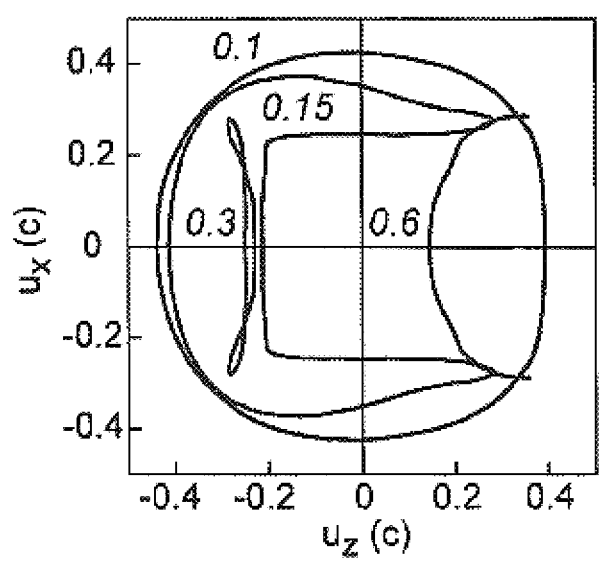
Figure 5A:
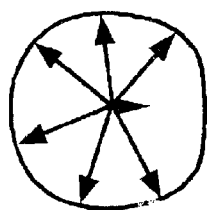
FIGS. 5A–5D are schematic diagrams illustrating the results of the radiation of a charge moving in the photonic crystal of FIG. 3B with v=0.1 c, 0.15 c, 0.30 c, and 0.6 c.
Figure 5B:
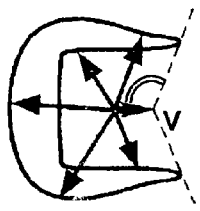
Figure 5C:
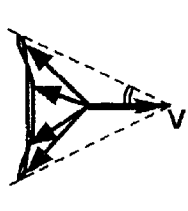
Figure 5D:
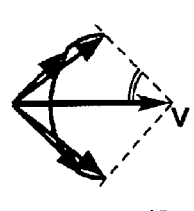

It is observed that the phase velocity of this photonic crystal in the long-wavelength limit ($\omega \to 0$) is $v_c$=0.44 c. For v<<vc, the radiation coalesces into resonances around $\omega \approx G \cdot v$. For larger v, the resonances merge together to form emission bands outside which CR is inhibited (FIG. 4A). As v increases, k and u within each emission band are strongly influenced by the photonic band structure (FIGS. 4B–4C). In particular, for $v<v_c$ most solutions exhibit negative z-components of group velocities, indicating backward-propagating Cherenkov effect for $v<v_c$ in general. Since radiation is allowed even for $v<<v_c$, some modes can have group velocities that exceed v. According to the analysis of FIG. 2, modes traveling faster than the moving charge produce either nearly isotropic wavefront in all directions (v≦0.1 c), or reversed radiation cones that point backward (v=0.15 c). While the Smith-Purcell radiation always has a similar isotropic wavefront, it cannot produce a reversed radiation cone. The reversed cone effect is also forbidden by causality in any uniform passive medium, and is therefore a feature unique in photonic crystals.

To confirm these predictions finite-difference time-domain simulations are performed of the CR in photonic crystals, using a thick boundary perfectly matched layer (PML) which consists of 10 periods of identical photonic crystal buried inside. This boundary condition can effectively absorb radiation modes in photonic crystals away from the band edge. The moving charge is implemented as a dipole of constant amplitude which points toward the direction of motion z and whose position depends on time. To verify negative CR, the fields are recorded on all points of an observation line perpendicular to z and the frequency components of the z-flux are calculated from those of the observed field values.

Figure 6A:
FIGS. 6A–6D are graphs showing the distribution of the radiation magnetic field perpendicular to the 2D plane with v=0.1 c, 0.15 c, 0.30 c, and 0.6 c.
Figure 6B:
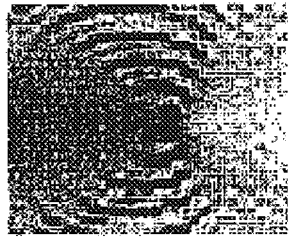
Figure 6C:

FIGS. 5A–5D show the calculated group velocities and expected radiation cone shapes. The simulated radiation field pattern and the frequency spectrum of the z-flux are shown in FIGS. 6A–6D and 7A–7D, respectively. FIGS. 6A–6C demonstrate the radiation below $v_c$, and FIGS. 7A–7C exhibit the negative z-flux frequency regions which are in agreement from what can be obtained from Eq. 2. Moreover, FIG. 6A shows the near-isotropic radiation at v=0.1 c, and FIG. 6B confirms the reversed CR cone. From FIG. 6, the angular distribution of radiation is also readily available. When v=0.1 c or 0.15 c, the radiation is distributed over a wide range of emission angles without producing a cone of intensity maxima. For v=0.3 c or 0.6 c, however, the CR becomes collimated, and a definite emission angle in both the forward and the backward direction for most of the radiation energy can be observed. Note in FIGS. 6D and 7D that the CR radiation at high velocities ($v>v_c$) in the first band are qualitatively similar to that in a uniform medium with very small dispersion (i.e. forward-pointing radiation cone and positive z-flux).

Figure 6D:
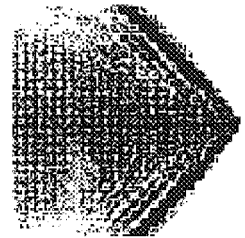
Figures 7A, 7B, 7C, 7D:
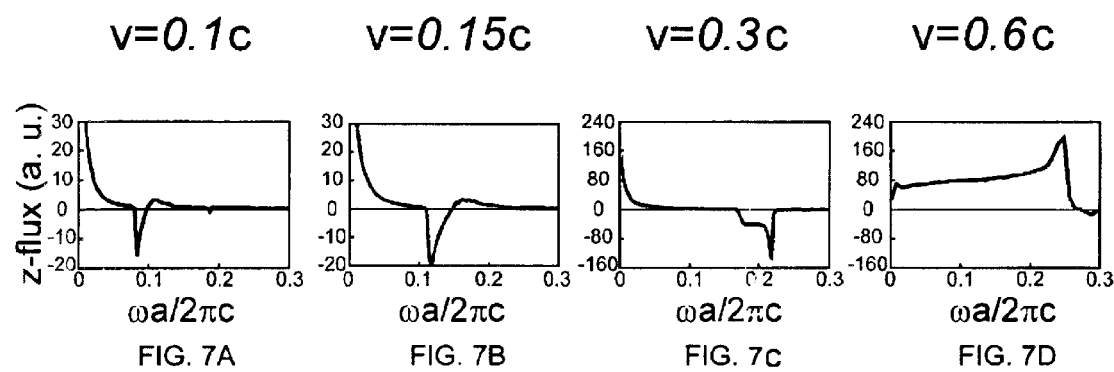
FIGS. 7A–7D are graphs showing the frequency spectrums of the radiation flux along the z-axis with v=0.1 c, 0.15 c, 0.30 c, and 0.6 c.

An important difference between radiation patterns for $v<v_c$ and $v>v_c$ is that the DC components ($\omega$=0) extends beyond the radiation cone in FIGS. 6A–6C, while in FIG. 6D the field outside the radiation cone is strictly zero. These DC components are also reflected in the strong peaks around $\omega$=0 shown in FIGS. 7A–7C. The finite flux values at $\omega \neq 0$ before the onset of negative z-flux is an artifact of finite computational size and time, and the DC components should not influence regions of $\omega \neq 0$ in ideally finite systems. Finally, it can be noted that there are strong, high-frequency "tails" of radiation behind the charge in all cases shown in FIGS. 6A–6D. These correspond to the radiation in the higher bands which have much smaller group velocity. Of course, here these tails can exhibit a backward radiation effect as well.

Although a 2D "air-holes-in-dielectric" structure has been previously considered, the same physics obviously applies to 3D photonic crystals in general with little change. In particular, dielectric cylinders or spheres in air appear to be a good candidate for experimental studies of these effects. The charged particles can be chosen to be electrons, which with high velocities should be available from emission through a voltage difference of several tens or hundreds of kilo-volts. They can then be directed to travel in the all-air channels of these photonic crystals. Direct experimental verification of the anomalous CR effects in photonic crystals introduced in this invention should thus be very possible.

Figure 8:
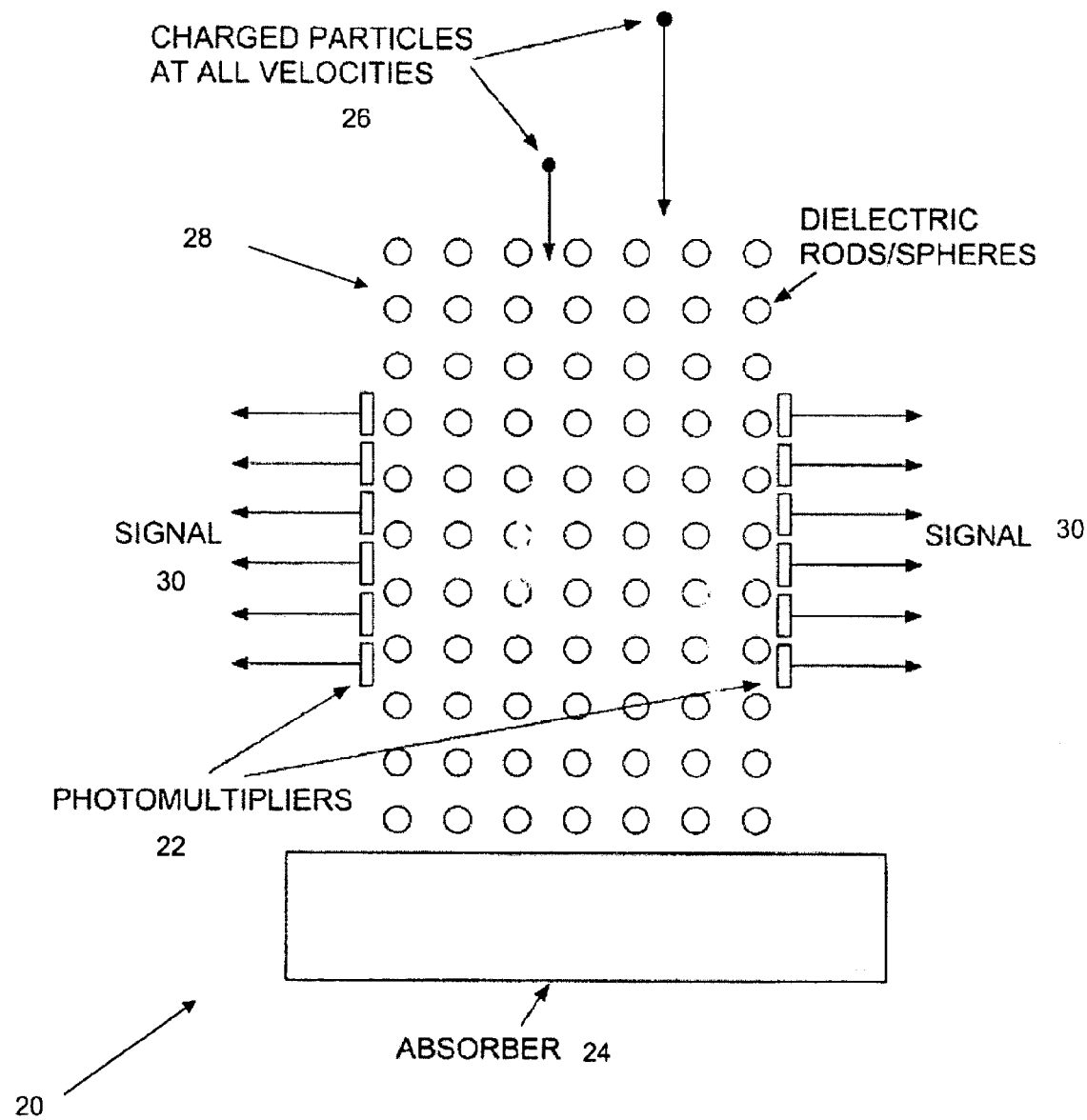
FIG. 8 is a schematic diagram illustrating a particle detector.

Particles traveling at speeds below the phase-velocity threshold cannot be detected by conventional CR counters, and currently their observation relies on other devices, such as scintillation counters, proportional counters, or cloud chambers. These other devices, however, lack the unique advantages of strong velocity sensitivity and good radiation directionality as in conventional CR. With a photonic crystal, one should be able to achieve velocity selectivity and distinctive radiation patterns without any velocity threshold. Using the invention, one can form a particle detector 20, as shown in FIG. 8, for counting of charged particles can now be made at arbitrary velocities using sensitive radiation detection devices, such as photomultipliers or vacuum photocell coupled to an amplifier. Charge particles 26 of all velocities are received in the all-air channel of a photonic crystal 28. The CR emitted by the charges is received by the photomultipliers 22 surrounding the photonic crystal 28, and the signals 30 can be amplified in an external amplifier. Note that waveguides may also be integrated into the photonic crystal to facilitate radiation collection. The sensitivity of this detector 20 only relies on the sensitivity of the photomultipliers 22 and does not require a velocity threshold. A number of devices measuring particle number, speed, charges or density flux can be built based on the detected radiation spectrum and wavefront pattern. Such devices are useful wherever particles of arbitrary energy are produced, such as in monitoring and controlling of nuclear reactors.

Figure 9:
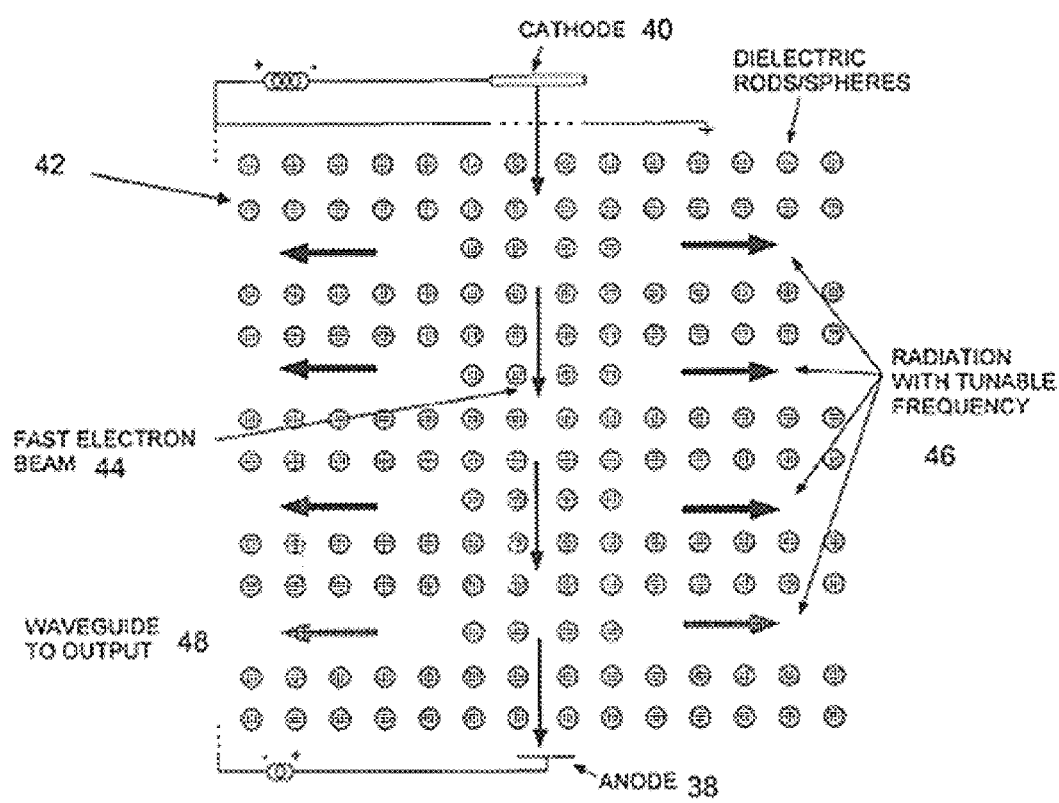
FIG. 9 is a schematic diagram illustrating a radiation source.

Moreover, a radiation source design 36 can be formed using CR, as shown in FIG. 9. An intense electron beam 44 is generated from high-voltage cathode 40 emission and pass through the all-air channel of a photonic crystal 42. It radiates and the radiation 46 can be collected by waveguides 48 that are built inside the photonic crystal 42. Of course, the radiation can also travel as bulk Bloch waves as discussed above and be collected by external devices without using output waveguides. The frequency of the radiation depends on its velocity and is tunable through the potential applied to the electron beam 44. Electromagnetic wave of arbitrary frequencies can now be generated using the effects as shown in FIG. 9. The range of the frequency of radiation 46 is now set by the photonic crystal 42 and the transparent spectral regime of the dielectric, thus selectively scalable beyond the optical wavelengths. Moreover, the frequency is tunable at will by changing the velocity of the particles. Furthermore, integrated photonic crystal line-defects can be employed to concentrate and guide the radiation. A "dense" electron beam may also lead to coherence in the output radiation. This type of radiation sources allows very flexible designs, and will be especially attractive for frequencies that are otherwise difficult to access, e.g. in terahertz regime.

All conventional applications of CR in the high-velocity regime, such as velocity measurement and selection, should be able to benefit from this invention. Since the particle can be made to travel in the air channel, the disturbance to the particle motion due to impurity scattering and random ionization, which introduce inherent losses in a conventional high-index material for CR detectors, is now completely absent. This could greatly enhance the performance of present CR detectors.

Although the present invention has been shown and described with respect to several preferred embodiments thereof, various changes, omissions and additions to the form and detail thereof, may be made therein, without departing from the spirit and scope of this invention.

What is claimed is:

1. A system for exhibiting Cherenkov radiation comprising:
   a beam of traveling charged particles; and
   a photonic crystal structure that receives said beam of charged particles, said charged particles move in said photonic crystal structure so that Cherenkov radiation is produced at all velocities without requiring resonances in the effective material constants of said photonic crystal structure.

2. The system of claim 1, wherein said beam of charged particles comprise of an electron beam.

3. The system of claim 2, wherein said photonic crystal structure comprises of output waveguides where said Cherenkov radiation outputs said photonic crystal structure.

4. The system of claim 3, wherein said Cherenkov radiation is received by one or more photomultipliers.

5. The system of claim 4, wherein said dispersion of charges particles are absorbed by an absorber.

6. The system of claim 3, wherein said electron beam is formed by a cathode-anode arrangement.

7. The system of claim 6, wherein said Cherenkov radiation is tunable by frequency.

8. The system of claim 7, wherein said frequency is tunable by scaling the photonic crystal structure.

9. The system of claim 2, wherein said photonic crystal structure comprises of no output waveguides.

10. The system of claim 2, wherein said beam of traveling charged particles travels in an all-air channel of said photonic crystal structure.

11. A method of exhibiting Cherenkov radiation comprising:
    providing a beam of charged particles; and
    providing a photonic crystal structure that receives said beam of charged particles, said charged particles moving in said photonic crystal structure so that Cherenkov radiation is produced at all velocities without requiring resonances in the effective material constants of said photonic crystal structure.

12. The method of claim 11, wherein said charged particles comprise of an electron beam.

13. The method of claim 12, wherein said photonic crystal structure comprises of output waveguides where said Cherenkov radiation outputs said photonic crystal structure.

14. The method of claim 13, wherein said Cherenkov radiation is received by one or more photomultipliers.

15. The method of claim 14, wherein said dispersion of charges particles are absorbed by an absorber.

16. The method of claim 13, wherein said electron beam is formed by a cathode-anode arrangement.

17. The method of claim 16, wherein said Cherenkov radiation is tunable by frequency.

18. The method of claim 17, wherein said frequency is tunable by scaling the photonic crystal structure.

19. The method of claim 12, wherein said beam of traveling charged particles travels in an all-air channel of said photonic crystal structure.

20. The method of claim 12, wherein said photonic crystal structure comprises no output waveguides.

* * * * *